(12) United States Patent
Hickox (10) Patent No.: US 9,472,339 B2
(45) Date of Patent: Oct. 18, 2016

(54) WIRELESS POWER TRANSFER SYSTEM TRANSDUCERS HAVING INTERCHANGEABLE SOURCE RESONATOR AND CAPTURE RESONATOR

(71) Applicant: DELPHI TECHNOLOGIES, INC., Troy, MI (US)

(72) Inventor: Jeffrey Michael Hickox, Middlefield, OH (US)

(73) Assignee: Delphi Technologies, Inc., Troy, MI (US)

(*) Notice: Subject to any disclaimer, the term of this patent is extended or adjusted under 35 U.S.C. 154(b) by 554 days.

(21) Appl. No.: 13/874,823

(22) Filed: May 1, 2013

(65) Prior Publication Data

US 2014/0327317 A1 Nov. 6, 2014

(51) Int. Cl.
*H01F 38/14* (2006.01)
*B60L 11/18* (2006.01)
*H01F 27/28* (2006.01)
*H01F 27/32* (2006.01)

(52) U.S. Cl.
CPC ........... *H01F 38/14* (2013.01); *B60L 11/1824* (2013.01); *H01F 27/2823* (2013.01); *H01F 27/325* (2013.01)

(58) Field of Classification Search
CPC .................................. H02J 17/00; H02J 5/00
USPC ........................................................ 307/104
See application file for complete search history.

(56) References Cited

U.S. PATENT DOCUMENTS

| 7,180,265 B2 | 2/2007 | Naskali et al. |
| 7,411,479 B2 | 8/2008 | Baarman et al. |
| 8,035,255 B2 | 10/2011 | Kurs et al. |
| 8,169,185 B2 | 5/2012 | Partovi et al. |
| 8,299,877 B2 | 10/2012 | Hong et al. |
| 2007/0131505 A1 | 6/2007 | Kim |
| 2011/0043047 A1 | 2/2011 | Karalis et al. |
| 2012/0025602 A1 | 2/2012 | Boys et al. |
| 2012/0032522 A1 | 2/2012 | Schatz et al. |

(Continued)

FOREIGN PATENT DOCUMENTS

| EP | 2848454 A1 | 3/2015 |
| EP | 2849314 A1 | 3/2015 |

(Continued)

OTHER PUBLICATIONS

European Search Report for Application No. EP 14165669, published Nov. 28, 2014.

*Primary Examiner* — Rexford Barnie
*Assistant Examiner* — Thai Tran
(74) *Attorney, Agent, or Firm* — Robert J. Myers (57) ABSTRACT

A wireless power transfer system that transmits electrical power from an electrical power supply to an electrical load using a source transducer and a capture transducer. The wireless power transfer system may be part of a wireless charging system for an electric vehicle. The source resonator coil in the source transducer and the capture resonator coil in the capture transducer are substantially identical and are interchangeable. The structures that hold the resonators in the transducers and the plates that provide a ground plane for the resonators in the source transducer and the capture transducer are also substantially identical and are interchangeable. Each resonator is formed of a carrier-winder, or bobbin, that has two substantially identical and interchangeable halves enclosing a magnetic core and is wound with a wire coil.

14 Claims, 8 Drawing Sheets

(56) References Cited

U.S. PATENT DOCUMENTS

2012/0313742 A1 12/2012 Kurs et al.
2013/0033118 A1 2/2013 Karalis et al.
2013/0057364 A1* 3/2013 Kesler et al. .............. 333/219.2
2015/0136499 A1* 5/2015 Ichikawa .................... 180/54.1

FOREIGN PATENT DOCUMENTS

| EP | 2858078 A1 | 4/2015 |
| WO | 2012099170 A1 | 7/2012 |
| WO | 2012099965 A2 | 7/2012 |
| WO | 2012099965 A3 | 11/2012 |

* cited by examiner

WIRELESS POWER TRANSFER SYSTEM TRANSDUCERS HAVING INTERCHANGEABLE SOURCE RESONATOR AND CAPTURE RESONATOR

TECHNICAL FIELD OF INVENTION

The invention generally relates to a wireless power transfer system, and more particularly relates to a wireless power transfer system having substantially identical and interchangeable source and capture resonators.

BACKGROUND OF THE INVENTION

Wireless electrical power transfer systems are known to incorporate a first resonator structure, hereafter referred to as a source resonator that includes a tuned resonant circuit configured to convert electrical energy from an electrical power source to a magnetic field and to transfer the magnetic energy via the magnetic field to a spaced apart second resonator structure, hereafter referred to as a capture resonator. The capture resonator also includes a tuned resonant circuit configured for receiving the magnetic field and converting the magnetic field to electrical energy that is supplied to an electrical load, such as a motor or battery back. Such a wireless power transfer system may be used for electrically charging an energy storage device, such as the battery pack of an electric or hybrid electric vehicle. In such a system, the source resonator may be located on, or embedded into, a surface for example the floor of a garage or the surface of a parking lot, and the capture resonator may be disposed on a vehicle. Alternatively, the source resonator may be embedded in a roadway and the capture resonator may receive energy to directly provide power to a vehicle motor or to charge the vehicle battery while the vehicle is moving.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a wireless power transfer system, hereafter referred to as the system, is provided. The system transmits electrical power from an electrical power source to an electrical load using a source resonator and a capture resonator that are inductively coupled. Each resonator includes an insulative split carrier-winder assembly having two substantially identical halves. Each half of the split carrier-winder defines an interior core retaining pocket and an outer coil retaining surface. A core tile formed of a material having high magnetic permeability is contained in the interior core retaining pocket of each carrier-winder assembly. Each resonator also includes a wire coil that is wound around the outer coil retaining surface of each carrier-winder assembly. Two substantially identical resonators may be used interchangeably as the source resonator or the capture resonator of the system.

The system further includes a first housing that is configured to contain the source resonator and a first resonator holder that is configured to secure the source resonator within the first housing. The system also includes a second housing that is configured to contain the capture resonator and a second resonator holder that is configured to secure the capture resonator within the second housing. The first resonator holder and the second resonator holder are substantially identical and are interchangeable.

The system further may include a first ground plate that is configured to provide an electrical ground plane for the source resonator and is configured to be secured to the first housing. The system also includes a second ground plate that is configured to provide an electrical ground plane for the capture resonator and is configured to be secured to the second housing. The first ground plate and the second ground plate are substantially identical and are interchangeable.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
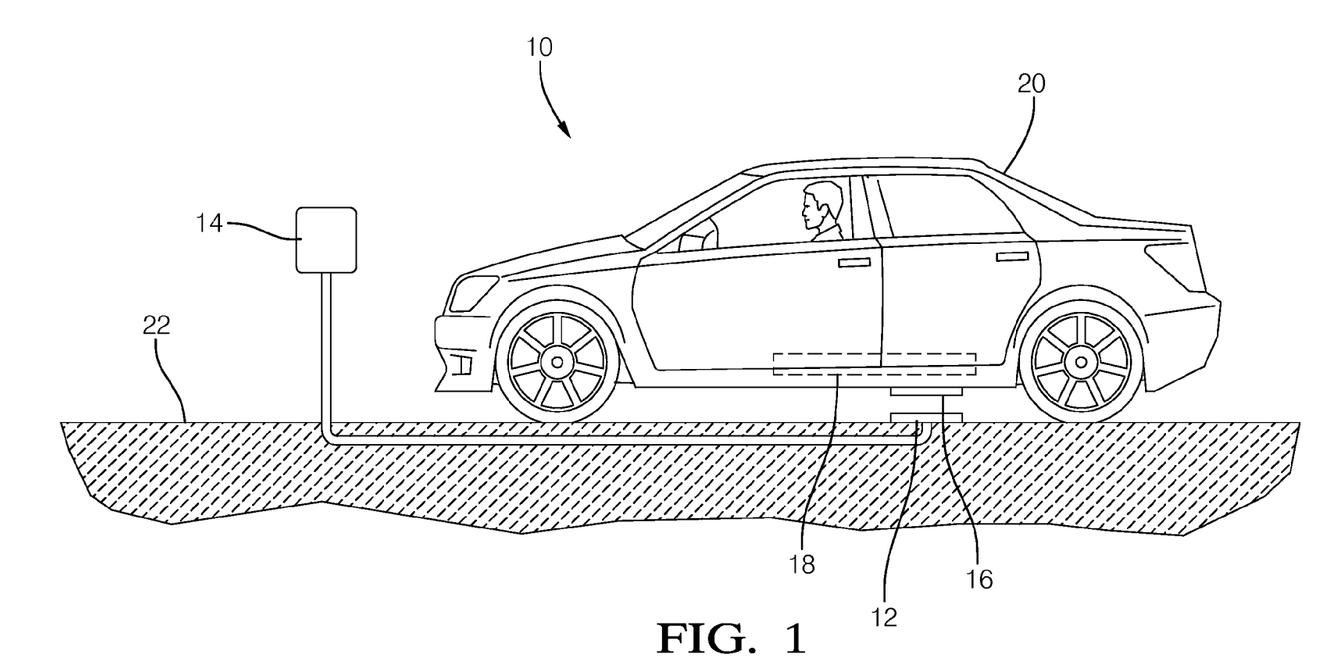
FIG. 1 is side view of a wireless power transfer system in accordance with one embodiment.

FIG. 1 illustrates a non-limiting example of a wireless power transfer system 10 that is suited for wireless vehicle charging that includes two transducers. The first transducer 12 is a source transducer 12 that is coupled to an electrical power supply 14, such as an electric vehicle battery charger. The second transducer 16 is a capture transducer 16 that is coupled to an electrical load 18, such as a battery pack of an electric or hybrid electric vehicle 20. As shown in FIG. 1, the source transducer 12 is disposed on the parking surface 22 of a parking lot and the capture transducer 16 is attached to the vehicle 20. The source transducer 12 converts electrical energy from the electrical power supply 14 to magnetic energy that is transmitted to the capture transducer 16. The capture transducer 16 then converts the magnetic energy to electrical energy that is supplied to the electrical load 18.

Figure 2A:
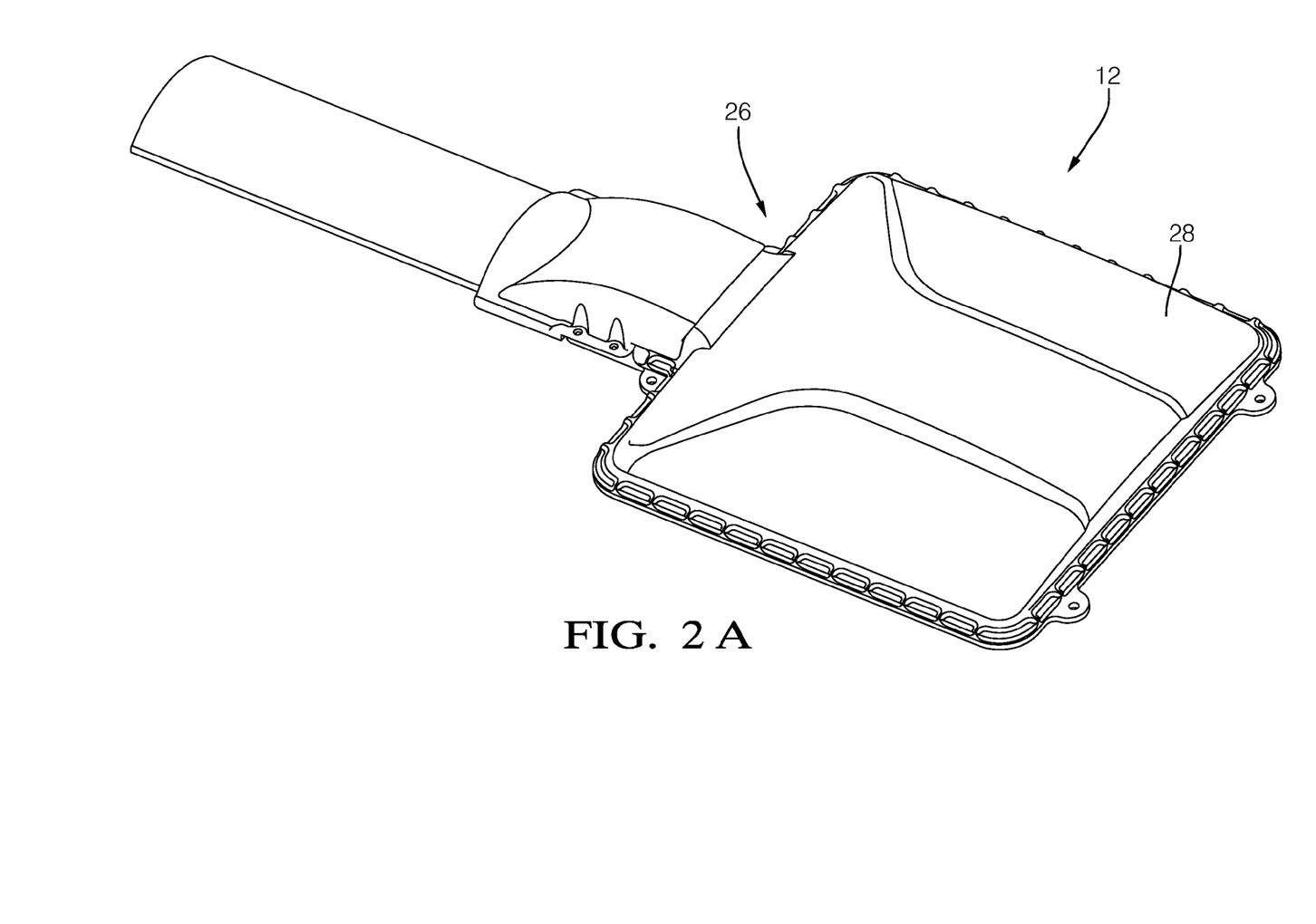
FIG. 2A is a top perspective view of a source transducer of the wireless power transfer system of FIG. 1 in accordance with one embodiment.
Figure 2B:
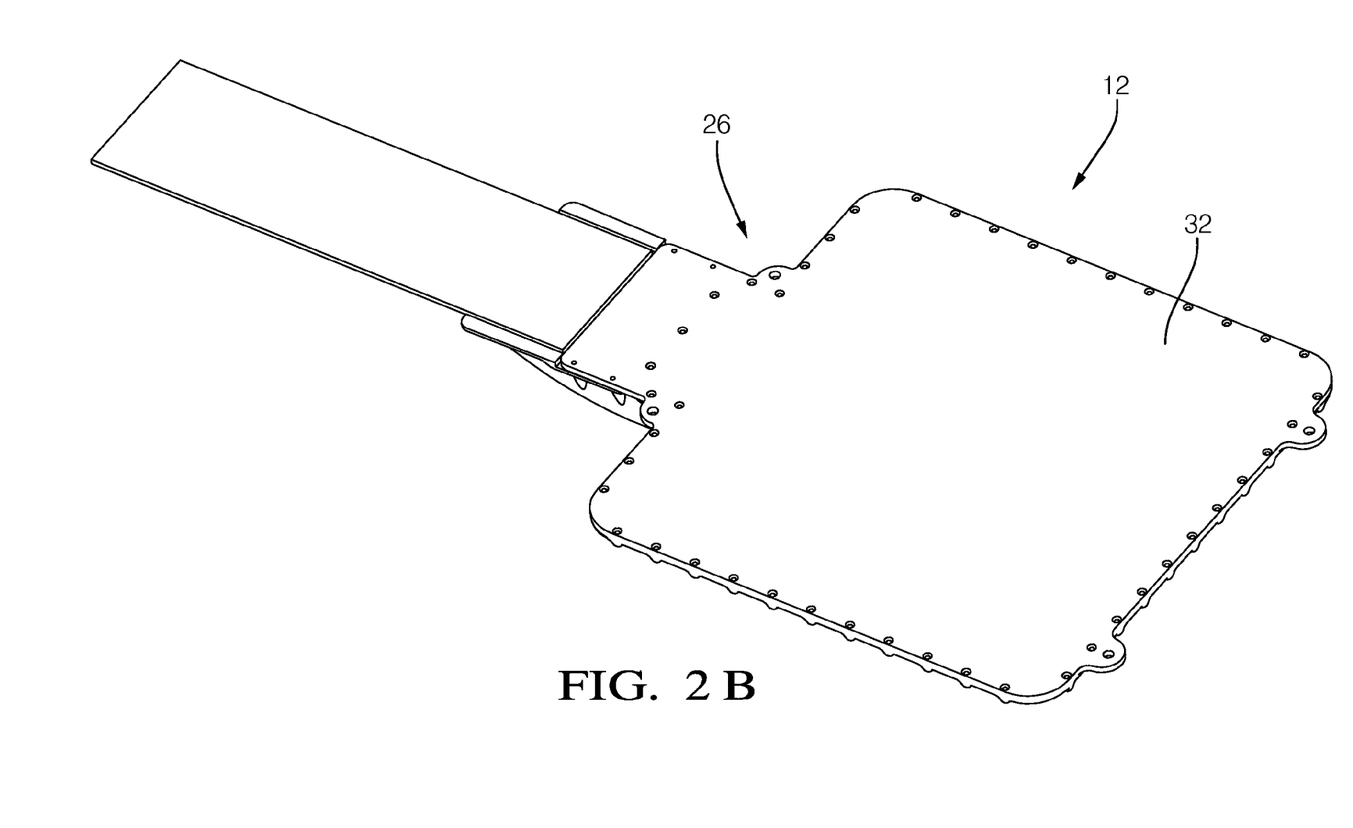
FIG. 2B is a bottom perspective view of the source transducer of the wireless power transfer system of FIG. 1 in accordance with one embodiment.
Figure 2C:
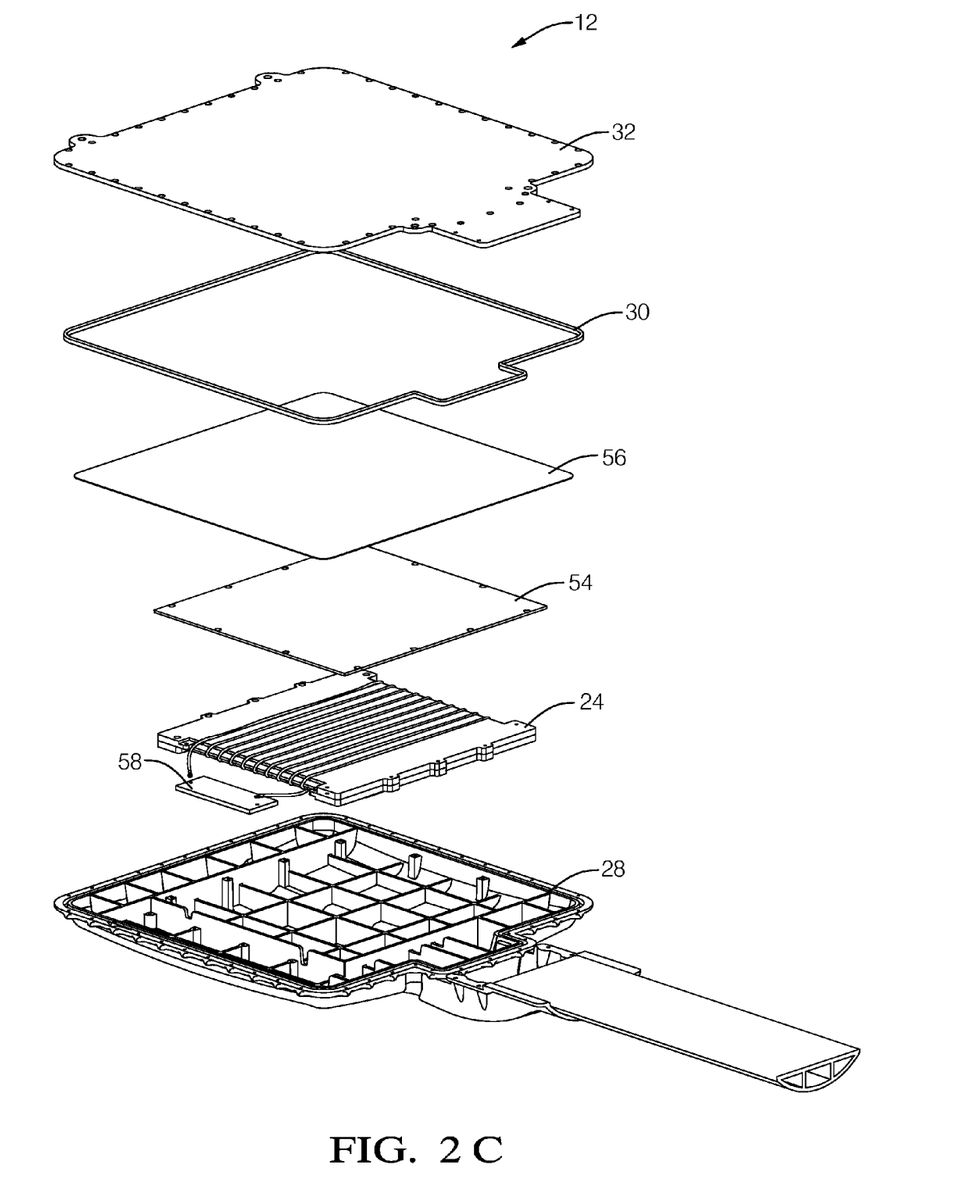
FIG. 2C is an exploded perspective view of the source transducer of the wireless power transfer system of FIG. 1 in accordance with one embodiment.

A non-limiting example of a source transducer 12 is illustrated in FIGS. 2A-2C The source transducer 12 includes a source resonator 24 contained within a source transducer housing 26. The source transducer housing 26 includes a source transducer cover 28, a source transducer seal 30, and source transducer mounting plate 32.

Figure 3A:
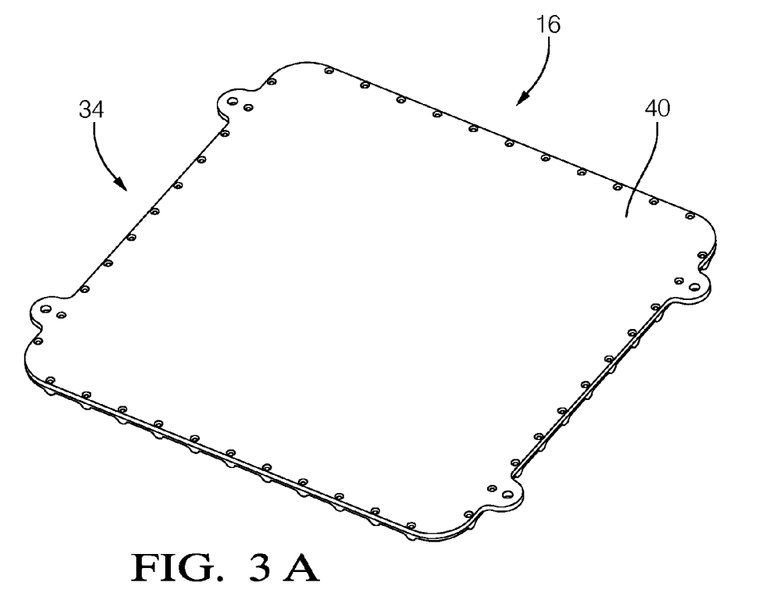
FIG. 3A is a top perspective view of a capture transducer of the wireless power transfer system of FIG. 1 in accordance with one embodiment.
Figure 3B:
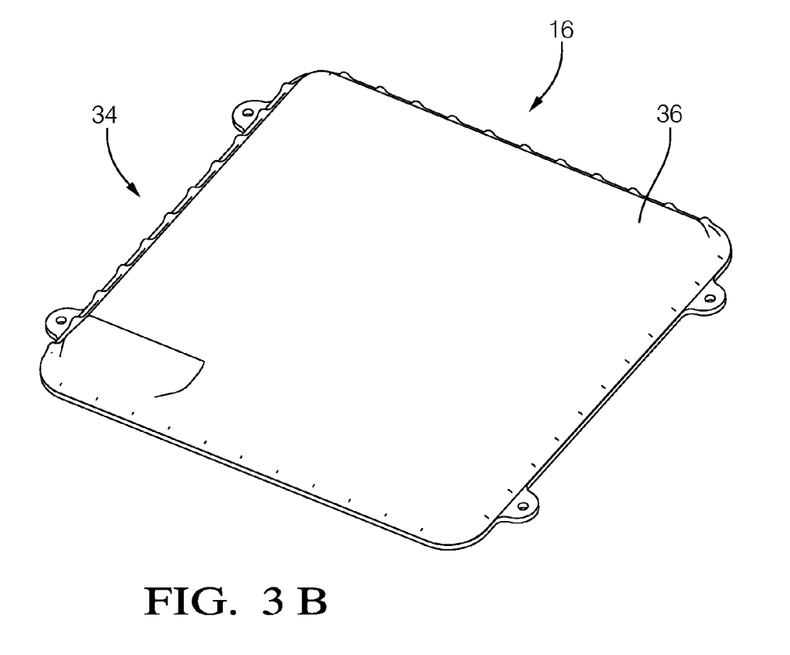
FIG. 3B is a bottom perspective view of the capture transducer of the wireless power transfer system of FIG. 1 in accordance with one embodiment.
Figure 3C:
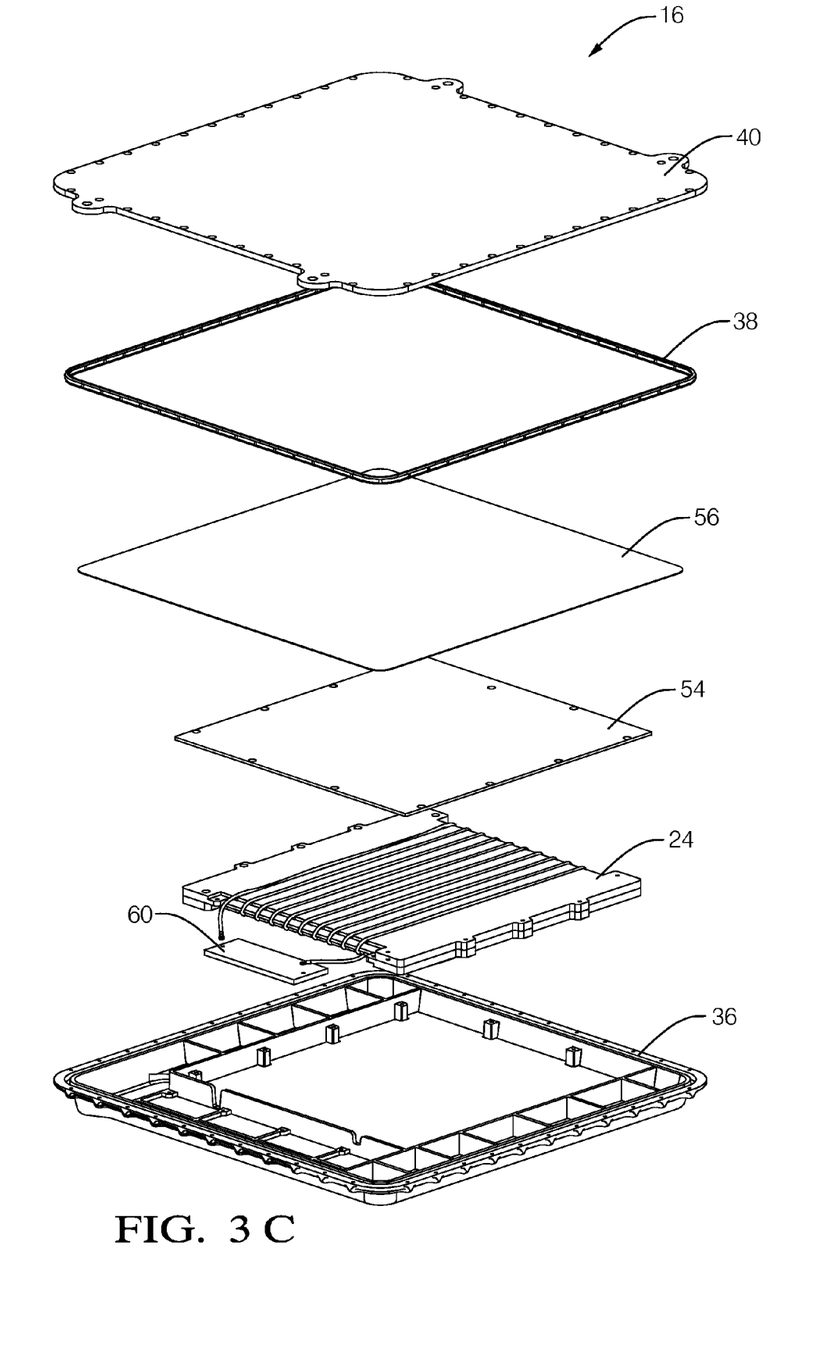
FIG. 3C is an exploded perspective view of the capture transducer of the wireless power transfer system of FIG. 1 in accordance with one embodiment.

A non-limiting example of a capture transducer 16 is illustrated in FIGS. 3A-3C. The capture transducer 16 includes a capture resonator 24 contained within a capture transducer housing 34. The capture transducer housing 34 includes a capture transducer cover 36, a capture transducer seal 38, and a capture transducer mounting plate 40. Differences between the source transducer housing 26 and the capture transducer housing 34 are driven by the different operating environments and mounting requirements of each transducer housing 26, 34. The source resonator 24 and the capture resonator 24 mounted within the transducer housings 26, 34 are designed so that two substantially identical resonator assemblies 24 may be used interchangeably as the source resonator 24 or the capture resonator 24.

The transducer covers 28, 36 are preferably formed of a non-conductive material, such as polypropylene (PP) plastic so that they do not affect the magnetic field between the source and capture resonators 24. The transducer covers 28, 36 may be fabricated using injection molding, sheet forming, or other plastic fabrication methods well known to those skilled in the art. The transducer covers 28, 36 define a cavity that is configured to hold the resonator assembly 24 as well as other components of the transducer 12, 16. The mounting plates 32, 40 are preferably formed of a corrosion resistant metal, such as anodized aluminum. As used herein, aluminum refers to aluminum-based alloys as well as elemental aluminum. The environmental seals 30, 38 are formed of a complaint material, such as a silicone rubber, in order to seal the transducer cover 28, 36 to the mounting plate 32, 40 and inhibit contaminants such as water, dirt, and road salt from entering the transducer housing 26, 34 and coming in contact with the resonator assembly 24 and the other components contained within the transducer housing 26, 34. The mounting plates 32, 40 are secured to the transducer covers 28, 36 by treaded fasteners (not shown). However, other methods of fastening the transducer covers 28, 36 to the mounting plates 32, 40, such as adhesives, rivets, or heat staking may alternatively be employed. The mounting plates 32, 40 provide structure to the transducer housings 26, 34 and also provide the mounting features to enable mounting of the transducers 12, 16 to the vehicle 20 or the parking surface 22. The mounting plates 32, 40 are preferably formed by machining an aluminum plate. Because it is a machined part, the mounting features of each mounting plate 32, 40 may be customized for each application of the transducer 12, 16 without affecting the design of the transducer cover 28, 36 of the transducer housing 26, 34.

Figure 4A:
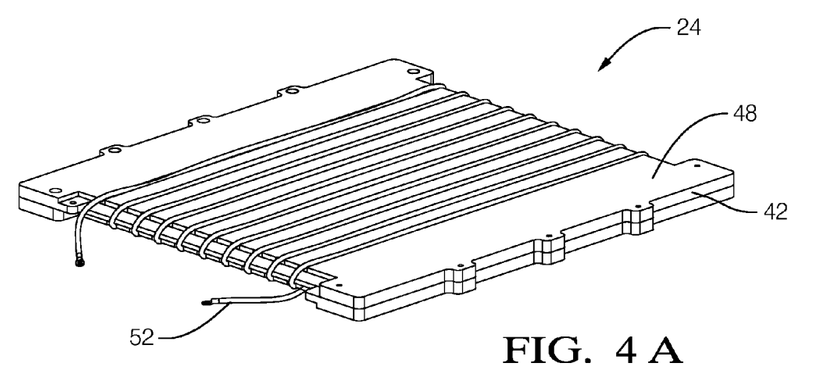
FIG. 4A is a perspective view of a resonator assembly of the source transducer of FIGS. 2A-2C or the capture transducer of FIGS. 3A-3C in accordance with one embodiment.
Figure 4B:
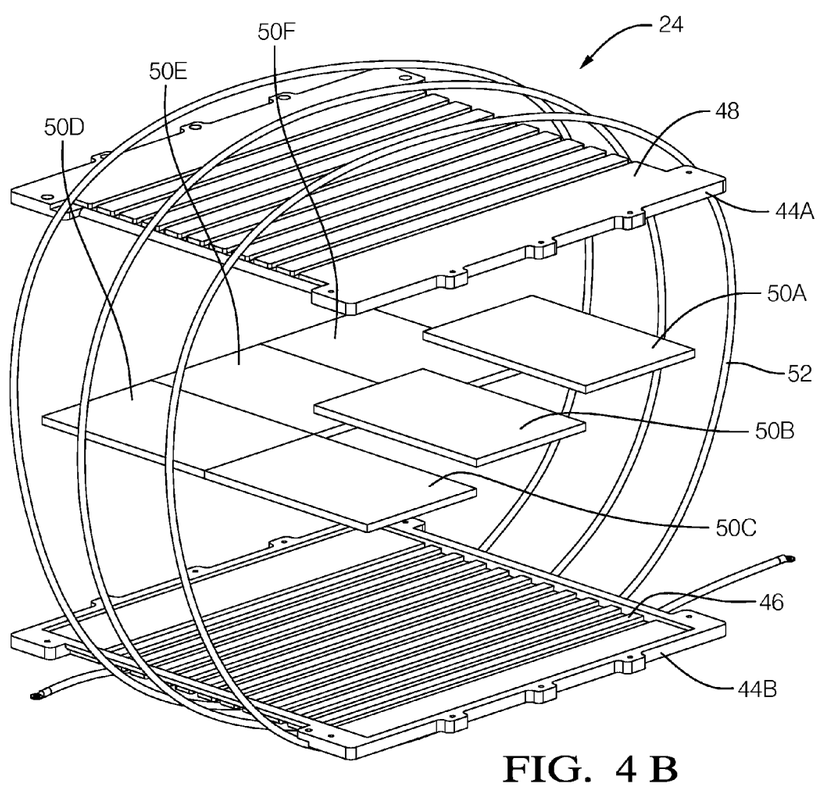
FIG. 4B is an exploded perspective view of a resonator assembly of the source transducer of FIGS. 2A-2C or the capture transducer of FIGS. 3A-3C in accordance with one embodiment.

A non-limiting example of a resonator assembly 24 is illustrated in FIGS. 4A and 4B. The resonator assembly 24 includes a generally planar carrier-winder assembly 42, hereinafter referred to as the carrier-winder 42 that has two substantially identical carrier-winder halves 44. The carrier-winder 42 has a generally rectangular shape. Each carrier-winder half 44 defines a core retaining pocket 46 in the interior portion of the carrier-winder half 44 and an outer coil retaining surface 48 on the exterior portion of the carrier-winder half 44. As used herein, interior and exterior portion refer to the interior and exterior as the carrier-winder halves 44 are oriented in the carrier-winder 42. The core retaining pockets 46 define a cavity in the interior portion of the carrier-winder 42. The features of the carrier-winder halves 44, such as the core retaining pockets 46, the coil retaining surface 48, and other features are symmetrical so that these features align when two carrier-winder halves 44 are joined. The carrier-winder halves 44 are attached to one another by treaded fasteners (not shown). However, other methods of fastening the carrier-winder halves 44, such as adhesives, rivets, or heat staking may alternatively be employed. The carrier-winder 42 is formed of a dielectric material, such as polybutylene terephthalate (PBT) or polyethylene terephthalate (PET) plastic. The carrier-winder halves 44 may be fabricated using injection molding or other plastic fabrication methods well known to those skilled in the art.

The resonator also includes a core tile 50 that is formed of a material that has a high magnetic permeability, such a ferrite, silicon steel, carbonyl iron, or vitreous metal material. The core tile 50 is contained in the cavity of the core retaining pocket 46 in the carrier-winder 42. The core tile 50 is characterized as a substantially planar rectangular plate. The core tile 50 acts as a magnetic core to concentrate the lines of magnetic flux generated by the resonator assembly 24. The size of the core tile 50 that can be economically manufactured may be limited to a size that is smaller than the magnetic core required for the resonator. In that case, the carrier-winder 42 of each resonator assembly 24 may contain a plurality of smaller core tiles 50A-50F. In order to accommodate a plurality of core tiles 50A-50F, the carrier-winder halves 44 may define a plurality of core retaining pockets 46.

The resonator further includes a wire coil 52 that is wound around the coil retaining surface 48 of each carrier-winder 42. The carrier-winder 42 serves as a bobbin for the wire coil 52. The wire forming the wire coil 52 is preferably an insulated stranded wire, commonly known in the art as Litz wire. The wire coil 52 is formed of a copper or an aluminum material, although other conductive materials may be used. As used herein, copper may referrer to a copper-based alloy or elemental copper. The coil retaining source defines features, such as grooves, on the outer portion of the carrier-winder 42 that are configured to at least partially contain a portion of the wire coil 52 in order to help retain the wire coil 52 in place. The wire coil 52 may be secured to the carrier-winder 42, for example by nylon wire cable ties (not shown).

The resonator assembly 24 illustrated in FIG. 4A has a generally planar rectangular shape. The rectangular shape provides a source transducer 12 and a capture transducer 16 that, in a vehicle application, provide adequate road clearance beneath the vehicle 20 and between the source and capture transducers 12, 16. Other embodiments of the resonator assembly 24 may be envisioned having other shapes, such as a toroidal shape.

Returning to FIGS. 2C and 3C, the resonator assemblies 24 are secured within the cavities of the transducer housings 26, 34 by resonator holders 54. Each resonator holder 54 is secured to one of the transducer covers 28, 36 by treaded fasteners (not shown). However, other methods of fastening the resonator holder 54 to the transducer cover 28, 36, such as adhesives, rivets, or heat staking may alternatively be employed. The resonator holder 54 used to secure the capture resonator 24 within are capture transducer housing 34 and the resonator holder 54 used to secure the source resonator 24 within the source transducer housing 26 are substantially identical and are interchangeable. The resonator holders 54 are preferably formed of a non-conductive material, such as PBT or PET plastic so that they do not affect the magnetic field between the source and capture resonators 24. The resonator holders 54 may be fabricated using injection molding or other plastic fabrication methods well known to those skilled in the art.

As illustrated in FIGS. 2C and 3C, the source transducer 12 and the capture transducer 16 each include a ground plate 56 that is configured to provide an electrical ground plane for the resonator. The ground plate 56 is preferably formed of a highly conductive material, such as copper. As shown in FIG. 2C, the source transducer ground plate 56 is secured to the source transducer housing 26. As shown in FIG. 3C, the capture transducer ground plate 56 is secured to the capture transducer housing 34. The source transducer ground plate 56 and the capture transducer ground plate 56 are substantially identical and are interchangeable.

As illustrated in FIGS. 2C and 3C, the source transducer 12 further includes a source transducer tuning network 58 and the capture transducer 16 contains a capture transducer tuning network 60. The mechanical form factor of the source transducer tuning network 58 and the capture transducer tuning network 60 may be the same, however, the inductance value of the source transducer tuning network 58 may be different than the inductance value of the capture transducer tuning network 60 so that the resonant frequency of the source resonator 24 and the resonant frequency the capture resonator 24 may be separately tuned. The capture transducer tuning network 60 and the source transducer tuning network 58 may include a capacitor network as well as other electronic components, such as resistors and/or inductors (not shown), that are mounted on a printed circuit board that is fastened within the respective transducer housing 26, 34.

The dimensions of the carrier-winder 42, the core tile 50, the gauge and number of turns of the wire in the wire coil 52 and the material used for the wire coil 52 and the core tile 50 are some of the factors that will determine the resonant frequency of the resonator assembly 24. The methods used to determine the resonant frequency or the source and capture resonators 24 are well known to those skilled in the art.

Figure 5:
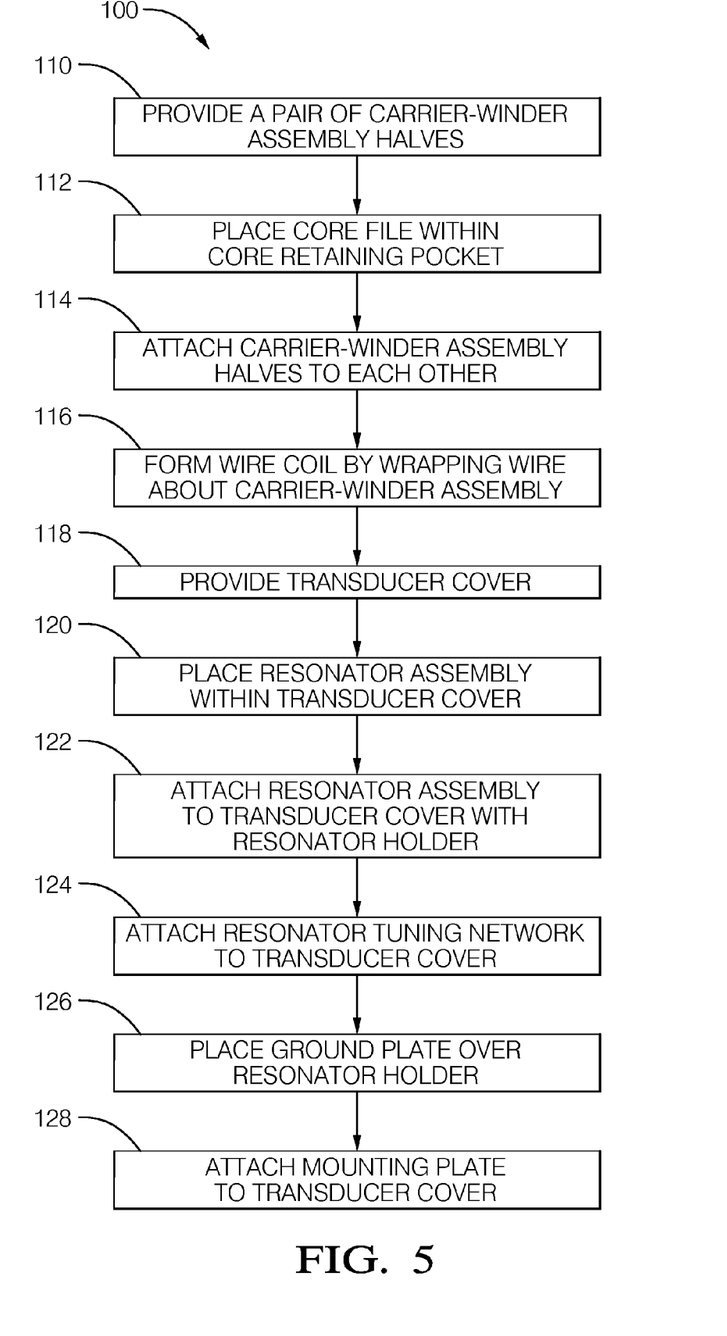
FIG. 5 is a flowchart of a method of assembling the source transducer of FIGS. 2A-2C or the capture transducer of FIGS. 3A-3C in accordance with one embodiment.

FIG. 6 illustrates a method 100 of assembling a source transducer 12 or a capture transducer 16 for a wireless power transfer system 10. The method 100 is the same for assembling either the source or capture transducers 12, 16.

In step 110, PROVIDE PAIR OF CARRIER-WINDER HALVES, two carrier-winder halves 44 are provided.

In step 112, PLACE CORE TILE WITHIN CORE RETAINING POCKET, a core tile 50 or a plurality of core tiles 50A-50F is placed in the core retaining pocket 46 of one of the carrier-winder halves 44.

In step 114, ATTACH CARRIER-WINDER HALVES TO EACH OTHER, one half 44 of the carrier-winder 42 is attached to the other half 44 of the carrier-winder 42 using threaded fasteners or other fastening means, thereby at least partially enclosing the core tile 50 within the carrier-winder 42.

In step 116, FORM WIRE COIL BY WRAPPING WIRE ABOUT CARRIER-WINDER, the wire coil 52 is formed by wrapping a predetermined length of Litz wire several times about the coil retaining surface 48 of the carrier-winder 42. The wire is inserted into grooves defined by the coil retaining surface 48 in order to provide proper spacing between the turns of the wire coil 52. The wire coil 52 may be attached to the carrier-winder 42 using nylon cable ties, adhesive such as hot melt glue, or other alternative means.

In step 118, PROVIDE TRANSDUCER COVER, a transducer cover 28, 36 is provided.

In step 120, PLACE RESONATOR ASSEMBLY WITHIN TRANSDUCER COVER, the assembled resonator 24 is placed within the cavity of the transducer cover 28, 36.

In step 122, ATTACH RESONATOR ASSEMBLY TO TRANSDUCER COVER WITH RESONATOR HOLDER, the resonator assembly 24 is attached to the transducer cover 28, 36 by placing the resonator holder 54 over the resonator assembly 24 and fastening the resonator holder 54 to the transducer cover 28, 36 using threaded fasteners or other fastening means.

In step 124, ATTACH RESONATOR TUNING NETWORK TO TRANSDUCER COVER, a source transducer tuning network 58 or a capture transducer tuning network 60 is placed with the cavity of the transducer cover 28, 36 and attached to the transducer cover 28, 36 using threaded fasteners or other fastening means. The ends of the wire coil 52 are connected to the source transducer tuning network 58 or the capture transducer tuning network 60. Wires used for connecting the source transducer 12 to the electrical power supply 14 may also be connected to the source transducer tuning network 58 and wires used for connecting the capture transducer 16 to the electrical load 18 may also be connected to the capture transducer tuning network 60 and routed through a portal (not shown) defined in the transducer cover 28, 36.

In step 126, PLACE GROUND PLATE OVER RESONATOR HOLDER, the ground plate 56 is placed over the resonator holder 54 within the transducer cover 28 and the seal 30, 38 is placed in a seal channel defined in the perimeter of the transducer cover 28, 36.

In step 128, ATTACH MOUNTING PLATE TO TRANSDUCER COVER, the mounting plate 32, 40 is placed on the transducer cover 28, 36 so as to engage the seal 30, 38 and the mounting plate 32, 40 is attached to the transducer cover 28, 36 using threaded fasteners or other fastening means.

Accordingly, a wireless power transfer system 10 having substantially identical and interchangeable source and capture resonator assemblies 24 is provided. The system 10 provides the benefit of reduced manufacturing costs because both the source transducer 12 and the capture transducer 16 share common resonator assemblies 24, resonator holders 54, and ground plates 56. Only the transducer housings 26, 34 (transducer covers 28, 36, seals 30, 38, and mounting plates 32, 40) and resonator tuning networks 58, 60 differ between the source transducer 12 and the capture transducer 16. The rectangular resonator assembly 24 also reduces manufacturing cost compared to toroidal resonator assemblies since it is easier to wrap the wire coil around the rectangular carrier-winder 42 than a toroidal carrier winder because the wire coil does not need to be threaded through a hole in the center of the carrier winder each time the wire coil is wrapped around the toroidal carrier winder nor does radial spacing need to be maintained between the windings of the wire coil. A method 100 of assembling a source transducer 12 and capture transducer 16 is also provided. The method 100 is a common process for both the source transducer 12 and the capture transducer 16. The process uses the transducer cover 28, 36 as a holder for all of the components of the transducer 12, 16 as they are assembled.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A wireless power transfer system, comprising:
   a source resonator including a first insulative split carrier-winder assembly having two identical and interchangeable halves, each half defining an interior core retaining pocket and an outer coil retaining surface, a first core tile formed of a material having high magnetic permeability and contained in the interior core retaining pocket of each carrier-winder assembly, and a first wire coil wound around the outer coil retaining surface of each carrier-winder assembly;
   a capture resonator including a second insulative split carrier-winder assembly having two identical halves, each half defining an interior core retaining pocket and an outer coil retaining surface, a second core tile formed of a material having high magnetic permeability and contained in the interior core retaining pocket of each carrier-winder assembly, and a second wire coil wound around the outer coil retaining surface of each carrier-winder assembly, wherein the source resonator and the capture resonator are structurally identical and interchangeable;
   a first housing configured to contain the source resonator;
   a planar first resonator holder formed of a non-conductive material and configured to secure the source resonator within the first housing;
   a second housing configured to contain the capture resonator; and
   a planar second resonator holder formed of a non-conductive material and configured to secure the capture resonator within the second housing, wherein the first resonator holder and the second resonator holder are structurally identical and interchangeable.

2. The wireless power transfer system according to claim 1, further comprising:
   a first ground plate configured to provide an electrical ground plane for the source resonator and configured to be secured to the first housing, wherein the first resonator holder is intermediate the first ground plate and the source resonator; and
   a second ground plate configured to provide an electrical ground plane for the capture resonator and configured to be secured to the second housing, wherein the second resonator holder is intermediate the second ground plate and the capture resonator and wherein the first ground plate and the second ground plate are substantially identical and are interchangeable.

3. The wireless power transfer system according to claim 2, wherein the first ground plate and the second ground plate are formed of a copper material.

4. The wireless power transfer system according to claim 1, wherein said first housing contains a source resonator tuning network, wherein said second housing contains a capture resonator tuning network, and wherein the inductance values of the source resonator tuning network are different than the inductance values of the capture resonator tuning network whereby the resonant frequency of the source resonator and the capture resonator may be separately tuned.

5. The wireless power transfer system according to claim 1, wherein the core tile is characterized as a substantially planar rectangular plate.

6. The wireless power transfer system according to claim 1, wherein the core tile is formed of a ferrite material.

7. The wireless power transfer system according to claim 1, wherein the outer coil retaining surface defines a plurality of grooves configured to at least partially contain the wire coil.

8. The wireless power transfer system according to claim 1, wherein each resonator comprises a plurality of core tiles.

9. The wireless power transfer system according to claim 8, wherein each half of said carrier-winder assembly defines a plurality of core retaining pockets.

10. The wireless power transfer system according to claim 1, wherein the first resonator holder is secured to the first housing and wherein the second resonator holder is secured to the second housing.

11. The wireless power transfer system according to claim 10, wherein the first resonator holder defines a plurality of apertures configured to receive threaded fasteners to secure the source resonator within the first housing and wherein the second resonator holder defines a plurality of apertures configured to receive threaded fasteners to secure the capture resonator within the second housing.

12. The wireless power transfer system according to claim 10, wherein the first resonator holder is secured to the first housing by a heat staking process and wherein the second resonator holder is secured to the second housing by the heat staking process.

13. The wireless power transfer system according to claim 10, wherein the first resonator holder is secured to the first housing by an adhesive and wherein the second resonator holder is secured to the second housing by another adhesive.

14. The wireless power transfer system according to claim 10, wherein the first resonator holder is secured to the first housing by a rivet and wherein the second resonator holder is secured to the second housing by another rivet.

* * * * *